Sept. 20, 1971   G. ZAKIM   3,605,366
COMPOSITE LAMINATE PANEL CONSTRUCTION
Filed Nov. 28, 1969
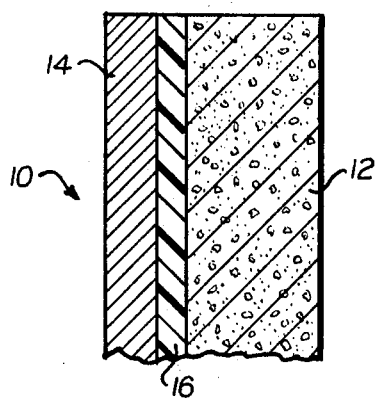
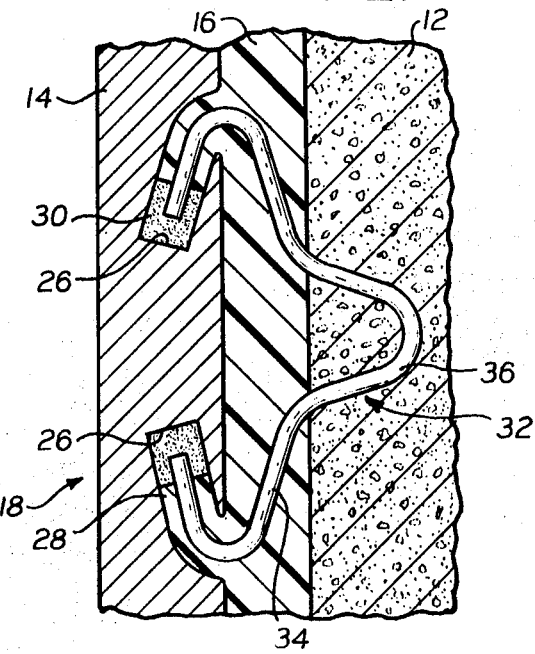
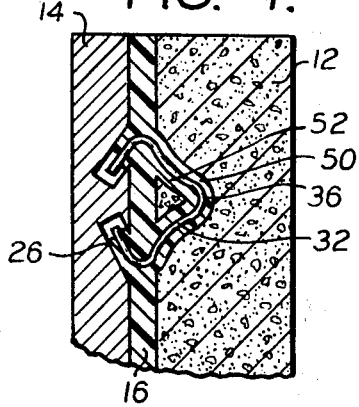
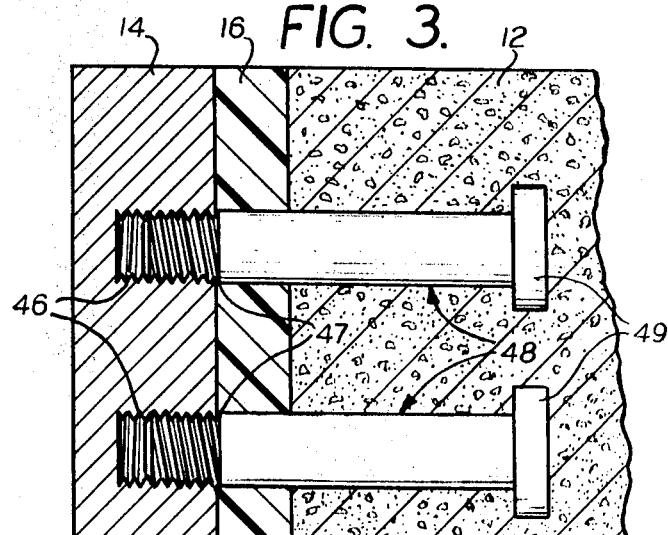
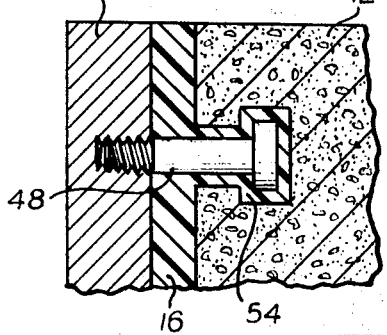
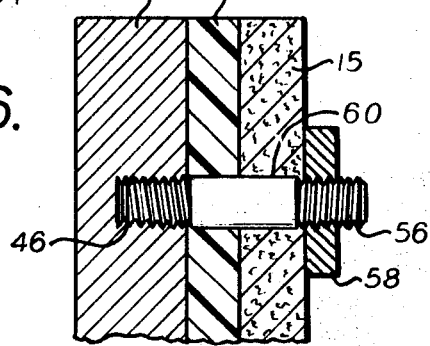
INVENTOR
GERALD ZAKIM
BY
Hubbell, Cohen + Stiefel
ATTORNEYS United States Patent Office 3,605,366
Patented Sept. 20, 1971

3,605,366
COMPOSITE LAMINATE PANEL CONSTRUCTION
Gerald Zakim, 8 Nottingham Road, Preakness Station 824,
Wayne, N.J. 07470
Filed Nov. 28, 1969, Ser. No. 880,845
Int. Cl. E04b 1/16
U.S. Cl. 52—378                                    11 Claims

ABSTRACT OF THE DISCLOSURE

A laminated panel construction having a supporting layer and a facing layer and a continuous quick-cure elastomer therebetween. Panels having connecting anchors secured to the supporting layer and the facing layer and having an intermediate portion in sealed relationship with the interlayer are also disclosed. A process for construction of the panels is also disclosed which includes the step of applying the elastomer in liquid form.

BACKGROUND OF THE INVENTION

Field of the invention

This invention relates to the field of composite wall building units for structures. More particularly, this invention pertains to laminated wall structures and methods for construction thereof.

DESCRIPTION OF THE PRIOR ART

Generally, in the construction of interior and exterior walls composed of stone and compositions thereof including cementitious material and various mineral composites, a laminate structure is used comprising an outer facing layer or facade, usually having ornamental or aesthetic characteristics, and an inner support or foundation layer which constitutes the supporting wall member. Such laminate structures are usually in the form of individual panels which are directly or indirectly secured to the basic girder structure of a building. Numerous methods for supportively connecting the two layers of the laminate to improve the strength of the wall and to reduce water seepage, cracking, etc., have been devised. Thus, for example, attempts have been made to use connective metal anchors embedded on or secured to and extending between the layers. While these increase the support strength of the wall and prevent, at least to some extent, the separation of the layers, they offer no solution to moisture seepage and penetration problems.

Other workers in the field have used various plastomeric type, water impermeable interlayers, such as an asphaltic mastic cement, epoxy resins, etc. These alone, however, do not supply sufficient resilient structural support between the layers and are generally prone to deterioration as a result of weathering. Attempts have also been made to use interlayers together with anchors. However, when used in connection with anchors, the interlayer is usually composed of preformed sheets which must be cut for passage of the anchor therethrough. These cuts or insertion-slots result in weak points in the interlayer which are susceptible to shear and tensile tearing. Also, the insertion slots interrupt the continuity of the interlayer thereby destroying the moisture protection provided thereby. Such known interlayers are generally difficult to apply to the layers in liquid form inasmuch as they require both expensive equipment and extended curing or setting periods.

SUMMARY OF THE INVENTION

I have discovered a new laminated wall unit and method for construction thereof which provides both superior laminate strength and resistance to moisture seepage and penetration. More particularly, I have found a new composite panel construction which comprises a cementitious support layer, a facing layer and continuous interlayer therebetween, said interlayer being a quick-setting elastomer capable of liquid application to the interior surface of the layers; such that the cured layer exhibits elastomeric and/or viscoelastomeric properties. The construction panels of my invention may also have anchors, usually metal, the end portions of which are secured to and extend between the facing and supporting layers. The middle portions of the anchors are in sealed relationship with interlayer thereby maintaining the continuity thereof so that the water impermeability obtained from the interlayer is maintained.

The panel of my invention may be formed by disposing the elastomeric interlayer in liquid form on the interior surface of a suitably sized area of the facing layer in a thickness of from about 0.001 to 0.125 inch. The elastomer is then allowed to set. The support layer is then cast directly onto the facing layer-interlayer combination.

My invention has the further advantage of requiring relatively inexpensive equipment for applying the interlayer, notwithstanding that it is applied as a liquid, because its quick setting properties allow the cementitious support layer to be immediately and continuously cast, depending, of course, on the set-time of the particular elastomer. Furthermore, the elastomeric nature of the interlayer flexibly connects the layers and allows movement due to thermal expansion and contraction, wind blast or settling of the two layers relative to each other without breaking the moisture-resistant seal.

BRIEF DESCRIPTION OF THE DRAWINGS

FIG. 1 is a cross-sectional view of a laminate panel construction in accordance with the present invention;

FIG. 2 is a view similar to FIG. 1 showing a modification of the present invention;

FIG. 3 is a view similar to FIG. 2 showing a further modification of the present invention;

FIG. 4 is a view similar to FIG. 2 showing yet a further modification of the present invention;

FIG. 5 is a view similar to FIG. 4 showing yet a further modification of the present invention; and FIG. 6 is a view similar to FIG. 2 showing yet a further modification of the present invention.

DESCRIPTION OF THE PREFERRED EMBODIMENTS

Referring now to the drawings in detail, and particularly to FIG. 1 thereof, my invention comprises a composite laminate panel construction generally designated by the reference numeral 10 and comprising a cementitious supporting layer 12, a facing layer 14 and a continuous interlayer 16 therebetween which includes a quick-set elastomer. The supporting layer 12 may be composed of cast-in-place materials such as, any type of cementitious material suitable for casting operations, for example, heavyweight, lightweight, latex and epoxy concretes, portland cement, Haydite, and pre-formed materials such as, for example, cement-asbestos, pressboard and the like. The facing layer 14 is usually composed of natural stone such as marble, travertine, granite, limestone and the like or synthetic stone substitutes such as polyester facing, epoxy, cement-asbestos, etc.

Interlayer 16 is preferably between about 0.001 to 0.125 inch thick and most preferably less than about 0.040 inch thick. It may be composed of suitable elastomers which are applied as a liquid and will rapidly set in place, i.e., within at least several hours and preferably within 15 to 30 minutes after application and which develop elastomeric and/or viscoelastomeric properties in situ. Illustrative of elastomers of this type are foamed and unfoamed polyurethanes obtained from the reaction of diisocyanates with polyfunctional compounds containing active-hydrogen groups such as polyesters, castor oil, water, polyester amides and polyalkylene ether glycols as well as mixtures of two or more of these classes of polyfunctional compounds. Such compounds are fully discussed in U.S. Pats. 3,345,311 and 3,362,921. Other materials suitable for use are polysulfide-coal tar compositions as described in U.S. Pat. 2,910,922, silicon and butyl rubbers, depolymerized natural rubber, chlorosulfonated polyethylene, butadiene-acrylonitrile resins and the like.

Particularly preferred are polyurethanes as described above having a molecular weight in the range of about 200 to 15,000.

The elastomers may also contain suitable extenders, such as, for example, plasticizers and fillers, bituminous products, tars, pitches, oils, hydrocarbon resins, coumarone-indene resins, clays, carbon black, slate flour, silica, limestone, calcium carbonate, asbestine, and the like.

The interlayer will usually contain small amounts of initiators, usually metallic soaps, such as, for example, dibutyl tin diluarate, cobalt octoate, lead octoate, tin octoate and other metallic compounds known to have catalytic activity; and cross linking agents, such as amine based polyethers, liquid polyols, dihydric alcohols, glycol esters, hydroxy carboxylic esters and the like.

The interlayer 16 must be capable of liquid application to the interior of the facing layer 14, be non-staining to the interfaces of facing layer 14 and supporting layer 12, solvent free and preferably possess a Shore A hardness in the range from about 5 to 50, a tensile strength in the range from about 100 to 1400 p.s.i., a modulus of 10–40 p.s.i. at 150% elongation, an elastic recovery of greater than 50% after 150% elongation and a shear strength greater than 20 p.s.i. (All of the above tensile properties except for Shore A hardness, are determined by A.S.T.M. D412–51t.)

Preferably, the interlayer 16 is composed of a polyurethane extended with a coal tar derivative, in amounts from about 0 to 400 parts of coal tar derivative per 100 parts of polyurethane with about 50 to 250 parts of coal tar derivative per 100 parts of polyurethane being most preferred.

To construct a laminate panel 10 in accordance with the aforedescribed structure, the pre-elastomeric interlayer 16 in liquid form is applied to the interior surface of facing layer 14. Interlayer 16 is then allowed to set or cure. It is not necessary that the interlayer completely set, but only that it have sufficient rigidity so that it will not flow during the casting of the supporting layer 12 thereon. The supporting layer 12 is then cast according to methods commonly used therefor or in the case of a preformed material placed directly onto the facing layer 14. Generally, the laminate construction is in the form of suitably sized panels, depending on the particular end use or architectural style in which they are to be used.

Referring now to FIG. 2, in accordance with a modification of the present invention, a panel 18 is shown which comprises facing layer 14, support layer 12 and interlayer 16 therebetween similar to the embodiment of FIG. 1. Panel 18 further comprises a U-shaped anchor 32 for mechanically securing support layer 12 to facing layer 14. Legs 34 of anchor 32 are secured in holes 26 of facing layer 14, preferably as by adhesive 30, and pass through and are in sealed relationship with interlayer 16. The upper portions of legs 34 and bight portion 36 of anchor 32 protrude from interlayer 16 and are embedded in support layer 12, whereby to effect the above mentioned securement.

To construct the panel of FIG. 2, preferably angularly related holes 26 are drilled partially through facing layer 14. The legs 34 of U-shaped anchor 32 are then inserted in holes 26. Anchor is preferably made of spring material and when so made, legs 34 may be spread away from one another and upon release thereof, immediately return to, or close to their normal position as illustrated in FIG. 2. Thus, anchor 32 is inserted in holes 26 by spreading legs 34 and inserting each leg 34 into one of the holes 26 and then releasing legs 34. Holes 26 are preferably spaced at an appropriate distance so that on release, legs 34 do not return to a completely unstressed position. Thus, legs 34 are preferably biased against the sides of holes 26 so as to secure anchor 32 in facing layer 14. Although anchor 32 is shown as being made of metal, it is understood that it may be composed of other materials which preferably have suitable spring or resilient properties such as plastic and the like.

Anchor 32 may be further secured in holes 26 by placing an adhesive 30 therein. Said adhesive may be any suitable binding material commonly used for such purposes, such as epoxy and the like.

The interlayer 16 is then applied to said facing layer-anchor combination to provide a continuous layer on said facing layer 14 and to completely surround each of the legs 34 of anchor 32, so as to form a seal about such legs. Thus, as shown in FIG. 2, a portion of said interlayer will fill up the unoccupied portion of holes 26 above said adhesive layer 30.

As further shown in FIG. 2, the upper portion of legs 34 and bight 36 protrude from the interlayer 16. Thus, to complete the panel construction of FIG. 2, the cementitious support layer 12 is cast directly on to interlayer 16 whereby to embed the bight 36 of anchor 32 in support layer 12. As a result, anchor 32 firmly connects facing layer 14 and support layer 12, and interlayer 16 provides a continuous impermeable moisture-proof seal between facing layer 14 and support layer 12.

FIG. 3 shows yet a further modification of the present invention similar to that of FIG. 2 but differing therefrom in that the facing layer 14 and support layer 12 are mechanically secured to each other by anchors comprising threaded bolts 48, the threaded ends 47 thereof being threadably secured in threaded holes 46 of facing layer 14. The upper portions and enlarged head 49 of bolts 48 protrude from interlayer 16 and are embedded in support layer 12. As described hereinabove, interlayer 16 is a continuous layer over the interior facing layer 14 and completely seals anchors 48. Moreover, it is understood that while anchors 48 are tightly secured in holes 46, a small amount of interlayer 16, when applied, may flow into and around the edges of holes 46 to provide an additional seal.

Modifications of the present invention, similar to those of FIGS. 2 and 3, are shown in FIGS. 4 and 5, respectively, the only difference being that in the latter embodiments, those portions of the connective anchor protruding from interlayer 16 have coatings thereon, which coatings are preferably comprised of the same materials comprising interlayer 16 and said coating being continuous and fused with interlayer 16. Thus, in FIG. 4, wherein U-shaped anchor 32 is used, the entire portion of anchor 32 which protrudes from facing layer 14 has a coating of the material comprising interlayer 16 as depicted at areas 50 and 52. In FIG. 5, in a similar manner, the upper portion and enlarged head of anchor 48 has a coating of the material comprising interlayer 16 as depicted at point 54.

FIG. 6 shows yet another embodiment of the present invention wherein supporting layer 15 is a preformed material such as pressboard or the like. As shown therein, stud 56 is threaded at both ends and one end thereof is threadably secured in threaded hole 46 of facing layer 14. The other threaded end of stud 56 passes through but is in sealed relation with the interlayer 16 as hereinabove described and further passes through a suitably sized hole 60 in support layer 15. The end of stud 56 protruding from hole 60 has nut 58 threadably secured thereon, said nut 58 being tightened against support layer 15 whereby facing layer 14 and support layer 15 are secured to one another.

The method of construction of the embodiments of FIGS. 3-6 is apparent from the description thereof and is, of course, essentially the same as that described hereinabove for the panels of FIGS. 1 and 2.

Referring to FIGS. 1 through 6, it is understood, of course, that the specific manner of securing the anchors to either the facing layer 14 or supporting layer 12, or whether the interlayer is applied to the interior surface of facing layer 14 or supporting layer 12 are not critical to the present invention. Thus, referring to FIG. 2, it is possible to reverse the heretofore described procedure by securing the anchor 32 to the supporting layer 12, applying the interlayer 16 in liquid form to supporting layer 12 and then placing or casting facing layer 14 thereon. It is important, however, that the interlayer 16 be applied as a liquid so as to insure complete continuity and impermeability thereof.

A preferred composition for the interlayer of the present invention may be prepared by mixing equal parts of components A and B, the compositions of which are set forth in Table 1. The mixing thereof should be carried out just prior to the application of the admixture to the interior surface of the facing or support layer.

The physical properties of the interlayer having the composition set forth in Table 1 and having a thickness of 0.040 inch is set forth in Table 2.

A second preferred composition for the interlayer of the present invention is set forth in Table 1A. This composition may be used as is without addition thereto of another component. The physical properties of an interlayer prepared from the composition of Table 1A are essentially the same as those set forth in Table 2.

TABLE 1.—INTERLAYER COMPOSITION

Component A: Parts
  Coal tar oil (Allied Chemical CP524) _____ 37.5
  Polyurethane (6000 mol. wt.) _____ 59.5
  Polymethylene polyphenylisocyanate _____ 3.0
Component B:
  Coal tar oil (Allied Chemical 1:1 CP524 and CP250) _____ 69
  Cure promoting agent (polyoxypropylene-oxyethylene—mol. wt.—4750) _____ 20
  CaO _____ 10.6
  Dibutyltindilaurate _____ 0.4

TABLE 1A

Parts
Polyurethane resin, molecular weight 10,000, isocyanate/hydroxyl ratio in the range of 3.0 to 5.0% _____ 45.0
CaO _____ 2.0
Coal tar oil _____ 52.0
Polymethylene polyphenylisocyanate _____ 0.8
Phenylmercuric acetate _____ 0.2

Variations can, of course, be made without departing from the spirit and scope of the invention.

Having thus described my invention what is desired to secure and claim by Letters Patent is:

1. In combination with a composite laminate panel construction comprising:
    (a) a supporting layer;
    (b) a facing layer;
    (c) an interlayer therebetween; and
    (d) a connective anchor, one end of which is secured to said facing layer, the intermediate portion of which is in sealed relationship with and passes through said interlayer, the other of which protrudes from said interlayer and is secured to said supporting layer, the improvement which comprises said interlayer being continuous and comprising a quick-cure elastomer selected from the group consisting of foamed and unfoamed polyurethanes obtained from the reaction of diisocyanates with polyfunctional compounds containing active-hydrogen groups, polysulfide-coal tar compositions, silicone rubbers, butyl rubbers, depolymerized natural rubber, chlorosulfonated polyethylene, butadiene-acrylonitrile resins, and mixtures thereof, wherein the protruding portion of said anchor is substantially completely coated with the elastomer comprising said interlayer, said coating being continuous and fused with said interlayer.

2. The panel construction of claim 1 wherein the quick-cure elastomer contains an additive selected from the group consisting of extenders, plasticizers and fillers.

3. The panel construction of claim 2 wherein the additive is a material selected from the group consisting of coal tar derivatives, bituminous products, tars, pitches, oils, hydrocarbon resins, coumarone-indene resins, terpenes, clays, carbon black, slate flour, silica, limestone, calcium carbonate, asbestine and mixtures thereof.

4. The panel construction of claim 1 wherein the interlayer is between about 0.001 to 0.125 inch thick.

5. The panel construction of claim 1 wherein there is more than one anchor.

6. The panel construction of claim 5 wherein said anchors are hairpin springs having bight portions and two legs each and wherein said facing layer has pairs of holes partially drilled therethrough for receiving said legs, each leg being disposed in one of said holes and being biased by spring deformation against the sides of said holes whereby said anchors are secured to said facing layer, and wherein the upper part of said legs and said bight portion protrude from said interlayer and are embedded in said support layer.

7. The panel construction of claim 5 wherein said anchors are bolts having a threaded end and an enlarged head end, and wherein said facing layer has complementary threaded holes partially drilled therethrough, and said anchors are threadably secured in said holes and said enlarged head end protrudes from said interlayer and is embedded in said support layer.

TABLE 2

| Property | Initial | After 28 days at 158° F., 75% R.H. | After 14 days at 180° F., 75% R.H. | Test method |
|---|---|---|---|---|
| Shore A | 12 | (1) | (1) | Shore A meter. |
| Elongation (percent) | 640 | 550 | 550 | ASTM D412-51t. |
| Modulus 150% (p.s.i.) | 25 | 30 | 30 | ASTM D412-51t. |
| Tensile strength (p.s.i.) | 125 | 105 | 105 | ASTM D412-51t. |
| Elastic recovery after 150% elongation (percent) | 98 | 98 | 98 | ASTM D412-51t. |
| Shear strength (p.s.i.) | 55 | 52 | 50 | ASTM D412-51t. |
| Weatherometer, 2,500 hours | | (2) | | ASTM D1171-61 Atlas twin arc. |
| Flow test inches at 200° F | None | None | None | SS-S-00200c. |
| Bond test, 15 cycles | | (3) | | Cycling at −20° F. for 24 hours, return to room temperature for 4 hours, then raise to 150° F. |
| Moisture vapor transmission (g./hr./100 sq. ft.) | 0.02 | 0.024 | 0.028 | |

1 Unchanged.
2 No cracking, crazing or hardening.
3 No cracking, separation or loss of bond.

8. The panel construction of claim 5 wherein said anchors are studs which are threaded at both ends and wherein said facing layer has complementary threaded holes partially drilled therethrough, one end of said studs being threadably secured in one of said holes and wherein the supporting layer has complementary holes completely drilled therethrough, and the other end of said studs extend through and protrude from said holes, said protruding ends having nuts threadably secured thereto, said nuts being tightly disposed against said supporting layer.

9. The panel construction of claim 1 wherein said interlayer possesses a Shore A hardness in the range from about 5 to 50, a tensile strength of about 100 to 1400 p.s.i., a modulus of about 10 to 40 p.s.i. at 100% elongation, an elastic recovery of greater than about 50% after 150% elongation and a shear strength greater than about 20 p.s.i., said properties except for Shore A hardness being determined by A.S.T.M. D412-51t.

10. The panel construction of claim 9 wherein the interlayer is composed of a polyurethane extended with a coal tar derivative in amounts ranging from about 0 to 400 parts of coal tar derivative per 100 parts of polyurethane.

11. A method for preparing a panel construction which comprises securing anchors to a facing layer, said anchors protruding from said facing layer, coating the interior surface of a facing layer with a continuous liquid interlayer, said interlayer comprising a quick-cure elastomer selected from the group consisting of polyurethanes obtained from the reaction of diisocyanates with polyfunctional compounds containing active-hydrogen groups, polysulfide-coal tar compositions, silicone rubbers and butyl rubbers depolymerized natural rubber, chlorosulfonated polyethylene, butadiene-acrylonitrile resins and combinations thereof, allowing the interlayer to set and then placing a supporting layer onto said set interlayer, and securing said anchors to said supporting layer.

References Cited
UNITED STATES PATENTS

| | | | |
|---|---|---|---|
| 1,053,231 | 2/1913 | Schweikert | 52—426 |
| 1,170,419 | 2/1916 | Coon & Van de Sandt | 52—426 |
| 2,422,461 | 6/1947 | Arquette | 52—598 |
| 3,299,601 | 1/1967 | Chiville | 52—513 |

FOREIGN PATENTS

| | | | |
|---|---|---|---|
| 248,327 | 12/1963 | Australia | 52—410 |
| 164,125 | 6/1921 | Great Britain | 52—410 |
| 980,953 | 1/1965 | Great Britain | 52—410 |

OTHER REFERENCES

American Builder, March 1962, page 125.

FRANK L. ABBOTT, Primary Examiner

R. A. SCHWARTZ, Assistant Examiner

U.S. Cl. X.R.

52—309, 410, 411, 513, 608